(12) United States Patent
Fu et al.

(10) Patent No.: US 11,518,684 B2
(45) Date of Patent: Dec. 6, 2022

(54) NAY MOLECULAR SIEVE WITH AN ALUMINUM-RICH SURFACE AND A PROCESS OF PREPARING SAME

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Qiang Fu, Beijing (CN); Yongxiang Li, Beijing (CN); Chengxi Zhang, Beijing (CN); Hexin Hu, Beijing (CN); Xuhong Mu, Beijing (CN); Xingtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 0 days.

(21) Appl. No.: 15/733,843

(22) PCT Filed: May 27, 2019

(86) PCT No.: PCT/CN2019/088484
§ 371 (c)(1),
(2) Date: Nov. 30, 2020

(87) PCT Pub. No.: WO2019/228290
PCT Pub. Date: Dec. 5, 2019

(65) Prior Publication Data
US 2021/0214236 A1    Jul. 15, 2021

(30) Foreign Application Priority Data

May 28, 2018  (CN) .......................... 201810525444.5
May 28, 2018  (CN) .......................... 201810528722.2

(51) Int. Cl.
| | |
|---|---|
| *B01J 29/06* | (2006.01) |
| *C01B 39/24* | (2006.01) |
| *B01J 29/08* | (2006.01) |
| *B01J 35/02* | (2006.01) |
| *B01J 35/10* | (2006.01) |
| *B01J 37/04* | (2006.01) |

(52) U.S. Cl.
CPC .............. *C01B 39/24* (2013.01); *B01J 29/084* (2013.01); *B01J 35/023* (2013.01); *B01J 35/1009* (2013.01); *B01J 35/1061* (2013.01); *B01J 37/04* (2013.01); *B01J 2029/081* (2013.01); *C01P 2004/62* (2013.01); *C01P 2006/12* (2013.01); *C01P 2006/16* (2013.01)

(58) Field of Classification Search
CPC ... C01B 39/24; C01B 39/205; C01P 2004/62; C01P 2006/12; C01P 2006/16; B01J 29/084; B01J 2029/081; B01J 2229/12; B01J 2229/16; B01J 2229/32; B01J 2229/36; B01J 2229/40; B01J 35/002; B01J 35/0006; B01J 35/1009; B01J 35/023; B01J 35/04; B01J 35/10; B01J 35/1061; B01J 35/1057; B01J 35/109; B01J 37/04; B01J 37/036; B01J 37/038; B01J 37/10; B01J 35/1038; B01J 35/1042; B01J 37/0018
USPC ........... 502/60, 64, 69, 79, 85; 423/700, 710
See application file for complete search history.

(56) References Cited

U.S. PATENT DOCUMENTS

| | | | |
|---|---|---|---|
| 2,882,244 | A | 4/1959 | Milton |
| 5,601,798 | A | 2/1997 | Cooper et al. |
| 5,821,298 | A | 10/1998 | Reynolds et al. |
| 2005/0272851 | A1 | 12/2005 | Agur et al. |
| 2011/0224067 | A1* | 9/2011 | Wormsbecher ........ B01J 35/023 502/79 |
| 2016/0229700 | A1* | 8/2016 | Liu ...................... B01J 35/1071 |

FOREIGN PATENT DOCUMENTS

| | | |
|---|---|---|
| CN | 1253988 A | 5/2000 |
| CN | 1363517 A | 8/2002 |
| CN | 1723265 A | 1/2006 |

(Continued)

OTHER PUBLICATIONS

Machine Translation of Description of CN 107970969, 2018, pp. 1-24.*
Machine Translation of Claims of CN 107970969, 2018, pp. 1-4.*

*Primary Examiner* — Elizabeth D Wood
(74) *Attorney, Agent, or Firm* — Novick, Kim & Lee, PLLC; Allen Xue

(57) ABSTRACT

A NaY molecular sieve with an aluminum-rich surface is prepared using a process that includes the steps of: a. mixing a directing agent and a first silicon source to obtain a first mixture, wherein the directing agent has a molar composition of $Na_2O:Al_2O_3:SiO_2:H_2O=(6-25):1:(6-25):(200-400)$; b. mixing the first mixture obtained in the step a with a second silicon source, an aluminum source and water to obtain a second mixture; c. carrying out hydrothermal crystallization on the second mixture obtained in the step b, and collecting a solid product. Calculated as $SiO_2$, the weight ratio of the first silicon source to the second silicon source is 1:(0.01-12). The NaY molecular sieve has larger aluminum distribution gradient from the surface to the center of the particle than the conventional molecular sieve.

30 Claims, 2 Drawing Sheets

(56) References Cited

FOREIGN PATENT DOCUMENTS

| | | | |
|---|---|---|---|
| CN | 101096274 | A | 1/2008 |
| CN | 101096275 | A | 1/2008 |
| CN | 101274764 | A | 10/2008 |
| CN | 101353168 | A | 1/2009 |
| CN | 101450320 | A | 6/2009 |
| CN | 101618348 | A | 1/2010 |
| CN | 102010511 | A | 4/2011 |
| CN | 102173436 | A | 9/2011 |
| CN | 105080590 | B | 11/2015 |
| CN | 105084388 | A | 11/2015 |
| CN | 106466618 | A | 3/2017 |
| CN | 106608643 | A | 5/2017 |
| CN | 106745045 | A | 5/2017 |
| CN | 107304373 | A | 10/2017 |
| CN | 107758684 | A | 3/2018 |
| CN | 107970969 | A | 5/2018 |
| CN | 107970970 | A | 5/2018 |
| RU | 2127227 | C1 | 3/1999 |
| RU | 2510293 | C2 | 3/2014 |
| RU | 2650897 | C1 | 4/2018 |

\* cited by examiner

NAY MOLECULAR SIEVE WITH AN ALUMINUM-RICH SURFACE AND A PROCESS OF PREPARING SAME

TECHNICAL FIELD

The present disclosure relates to a NaY molecular sieve with an aluminum-rich surface and a process of preparing same.

BACKGROUND

At the end of 1950s, Milton and Breck successfully develops Y-type molecular sieves. Due to a $SiO_2/Al_2O_3$ ratio in the structure of NaY molecular sieves higher than that of X-type molecular sieves, the thermostability and water stability of NaY molecular sieve were improved. In the early 1990s, Grace company develops a directing agent method to prepare NaY molecular sieve, in which water glass is used as a raw material to replace expensive silica sol, simplifying the process and shortening the growth cycle, so that the NaY molecular sieve is quickly and widely applied to the fields of petrochemical industry, particularly petroleum cracking catalysis. Among the hundreds of molecular sieves that have been developed to date, what is most widely used in industry is the Y molecular sieve. At present, the preparation of NaY molecular sieve mainly adopts a crystal gel method in industry. Due to the use and improvement of the crystal gel, the crystallization time of the Y-type molecular sieve is greatly shortened, which allows the industrialization of the Y-type molecular sieve.

The Y-type molecular sieve has an FAU topology, wherein each unit cell is composed of 192 $TO_4$ (T=Si, Al). The Y molecular sieve contains a supercages with a diameter of 1.2-1.3 nm, and the twelve-membered ring of the Y molecular sieve has a orifice diameter as high as 0.74-0.75 nm. The silica to alumina ratio of the commercial Y molecular sieve is typically less than 2.8. According to the Loewenstein mechanism, the atom at the tetrahedral position immediately adjacent to the framework Al atoms cannot be an Al atom, so regarding a given Al atom, the only possibly nearest position for another Al atom around the given Al atom is the para-position in an adjacent quaternary ring relative to the given Al atom. Regarding a given Al atom, the aluminum atoms at the para-position in adjacent quaternary rings are called NNN-Al. The number of NNN-Al of each framework aluminum may be 0, 1, 2, and 3. The characterization of NNN-Al in a Y-dealuminized molecular sieve by using $^{29}Si$ MAS NMR shows that the less Si(nAl) (n≥2) in the molecular sieve, the more the relative content of 0-NNN-Al is. Theoretical calculation studies on the framework aluminum of the molecular sieve show that as the number of NNN-Al increases, the acidity of the molecular sieve gradually decreases, and only isolated aluminum atoms (0-NNN-Al) show strong acid properties. The hydrothermal stability of the molecular sieve is also related to the content of framework aluminum in the molecular sieve, and as the content of framework aluminum in the molecular sieve is reduced, the unit cell of the molecular sieve is reduced, so that the molecular sieve has better thermal stability.

Commercially directly prepared Y-type molecular sieves are typically of Na-type, have a framework silica to alumina ratio (Si/Al) of less than 2.8, and require sodium and aluminum removal before being added to the catalyst. The dealuminization process is very important to the application of the Y-type molecular sieve, which can not only improve the hydrothermal stability and the acid strength of the Y-type molecular sieve, but also construct a secondary pore passage in the molecular sieve. However, dealuminization results in change of the distribution of framework aluminum within the molecular sieve, which affects the acidity of the dealuminized Y molecular sieve. Studies have shown that as dealuminization of molecular sieves proceeds, the acid strength of the molecular sieves increases gradually, indicating that framework aluminum atoms containing weak acid are more easily removed. The silicon-aluminum ratio of the directly prepared NaY molecular sieve is generally lower. When the molecular sieve is moderately dealuminized, the n-NNN-Al (n=1, 2, 3) containing weak acid is preferentially removed, and the 0-NNN-Al containing strong acid is more retained, so dealuminization increases the relative content of the strong acid sites in the molecular sieve. When the aluminum atom in the FAU molecular sieve unit cell is more than 64, the FAU molecular sieve does not contain 0-NNN-Al, and the molecular sieve does not contain strong acid site. As dealuminization proceeds, the amount of 0-NNN-Al in the FAU molecular sieve increases and the strong acid sites increase. When the aluminum atoms in the FAU molecular sieve unit cell are reduced to 29, the FAU molecular sieve has the largest number of 0-NNN-Al and the largest content of strong acid sites. Continuing to dealuminize the Y molecule, 0-NNN-Al instead decreases, resulting in a decrease in strong acid sites. Because the dealuminization process selectively removes the n-NNN-Al, the dealuminized Y molecular sieve has less n-NNN-Al, more 0-NNN-Al and strong acid sites, compared with the directly prepared Y molecular sieve under the condition of the same silicon-aluminum ratio.

The dealuminization process of the molecular sieve is a complex process which is difficult to control. The dealuminization of the aluminum is very sensitive to dealuminization conditions, and dealuminization degree of the surface and of the bulk phase of the catalyst are difficult to be dealuminized to a same degree. The aluminum on the surface of the molecular sieve is usually easier to remove, and the removal of the aluminum in the bulk phase of the molecular sieve requires more rigorous dealuminization conditions, which can in turn cause collapse of the framework structure of the molecular sieve and damage of micropores, so that the aluminum distribution of the Y molecular sieve before dealuminization modification has great influence on the pore structure and acid property after dealuminization.

The existing literatures do not report sufficient research on molecular sieves with aluminum-rich surfaces, especially NaY molecular sieves. CN1363517A discloses a method for preparing an aluminum-rich AFI type molecular sieve, which crystallizes aluminum-rich gmelinite by adjusting the feed ratio. CN101096274A and CN101096275A disclose a method for preparing aluminum-rich Beta zeolite, comprising preparing a silica-alumina cogel in the presence of a hydrolytic agent, or impregnating a silica source with an acidic aluminum source to prepare a silica-aluminum source, roasting and crushing the silica-aluminum source to obtain the aluminum-rich Beta zeolite. In CN101274764A and CN101353168A, nano-sized aluminum-rich Beta zeolite is prepared by similar method or in the presence of fluoride ion. All the methods for preparing the aluminum-rich molecular sieve are realized in a one-step hydrothermal preparation process. Early X-type molecular sieves, as described in U.S. Pat. No. 2,882,244, although also belonging to the faujasite structure molecular sieves with a very high aluminum content, could not be used in the catalytic process replacing the Y-type molecular sieves and the aluminum-rich Y-type molecular sieves because they did not belong to the Y-type molecular sieve category and their hydrothermal structural stability was poor. CN102173436B discloses a method for preparing an aluminum-rich Y molecular sieve by a two-step hydrothermal preparation method and carrying out modification with rare earth. The method is characterized in that the molecular sieve is prepared by uniformly mixing a NaY type molecular sieve with equal weight of colloid prepared from a silicon source and an aluminum source at a molar ratio of $Na_2O/SiO_2$=0.3-0.5, $SiO_2/Al_2O_3$=5-7, $H_2O/Na_2O$=40-70, carrying out a two-step hydrothermal synthesis for 0.5-4 hours at 60-110° C. to obtain a NaY molecular sieve with aluminum-rich surface, carrying out rare earth ion hydrothermal exchange, adjusting the pH value of the slurry to 7-10 with aqueous ammonia, carrying out rare earth oxide deposition, carrying out vacuum roasting for 0.5-4 hours at 450-750° C. under a system pressure of 0.001-0.09 MPa, and then carrying out ammonium salt aqueous solution exchange until the content of $Na_2O$ reaches ≤1.0 wt %, so as to obtain a rare earth Y type molecular sieve with a high surface area having a rare earth content of 10-20 wt % calculated as $RE_2O_3$ and a BET specific surface area of ≥600 $m^2/g$. In view of the preparation process, because of the lack of any directing agent, the element aluminum supplemented in the two-step hydrothermal synthesis is difficult to enter the Y molecular sieve framework to become framework aluminum.

SUMMARY OF THE INVENTION

The purpose of the present disclosure is to provide a NaY molecular sieve with an aluminum-rich surface, which has an aluminum distribution gradient from surface to center of the particle larger than conventional NaY molecular sieves, and a process of preparing the NaY molecular sieve.

To achieve the above purpose, a first aspect of the present application involves: providing a NaY molecular sieve with an aluminum-rich surface, wherein the Al distribution index, D, of the molecular sieve satisfies: 1.01≤D≤10, preferably 1.1≤D≤6, more preferably 1.2 or 1.3≤D≤4, wherein D=Al (S)/Al (C), Al (S) denotes the aluminum content on surface and in the region 2 to 6 nm below the surface of the molecular sieve, as measured by the XPS method, and Al (C) denotes the aluminum content of the entire molecular sieve, as measured by the XRF method. In a preferred embodiment, the molecular sieve with an aluminum-rich surface has a molar ratio of $SiO_2/Al_2O_3$ on surface of 1 to 10, preferably 2 to 8, and more preferably 2.5 to 5, and a molar ratio of $SiO_2/Al_2O_3$ in bulk phase of 2 to 20, preferably 4 to 15, and more preferably 6 to 10.

The NaY molecular sieve with an aluminum-rich surface according to the present invention has an Al content, calculated as $Al_2O_3$, of 18-26 wt %, preferably 21-25 wt %.

The NaY molecular sieve with an aluminum-rich surface according to the present invention has an average particle size of 200-600 nm, preferably 400-500 nm.

The NaY molecular sieve with an aluminum-rich surface according to the present invention has a specific surface area (BET method) of 640-790 $m^2/g$, preferably 690-780 $m^2/g$. The NaY molecular sieve with an aluminum-rich surface according to the present invention has a pore volume (BET method) of 0.34-0.50 ml/g, preferably 0.36-0.45 ml/g.

A second aspect of the present application involves: providing a process of preparing a NaY molecular sieve according to the first aspect of the present application, the process comprising the steps of:

a. Mixing a directing agent with a first silicon source to obtain a first mixture, wherein the molar composition of the directing agent is $Na_2O:Al_2O_3:SiO_2:H_2O$=(3-50):1:(3-50):(100-600), preferably (6-25):1:(6-25):(200-400);

b. Mixing the first mixture obtained in the step a with a second silicon source, an aluminum source and water, to obtain a second mixture;

c. Carrying out hydrothermal crystallization on the second mixture obtained in the step b, and collecting the solid product;

wherein, calculated as $SiO_2$, the weight ratio of the first silicon source to the second silicon source is 1:(0.001-20), preferably 1:(0.01-12).

Optionally, in step a, the directing agent is prepared by steps comprising: mixing an aluminum source (such as sodium metaaluminate) for the directing agent and water glass to obtain a third mixture, carrying out dynamic aging and standing aging on the third mixture, and then mixing the third mixture with water, to obtain the directing agent.

Preferably, the dynamic aging comprises: aging under stirring at a temperature of 15-60° C. for 1-100 hours, preferably 3-60 hours, more preferably 5-48 hours, or 15-48 hours; and the standing aging comprises: aging by standing at a temperature of 15-60° C. for 0.5-100 hours, preferably 3-60 hours, more preferably 5-48 hours, or 5-15 hours or 15-48 hours.

Optionally, in step a, the first silicon source is at least one selected from the group consisting of water glass, colloidal silica and silica sol.

Optionally, in step a, the mixing is performed under stirring, while the conditions for stirring are not particularly limited, as long as homogeneous mixing is achieved. Particularly, when the first silicon source is a solid silicon source, the mixing is performed under stirring for, e.g., 30 to 180 min.

Optionally, in step b, the amounts of the first mixture, the second silicon source, the aluminum source and water are not particularly limited, provided that the molar composition of the second mixture is $Na_2O:Al_2O_3:SiO_2:H_2O$=(1-10):1:(5-50):(100-600), preferably (2-6):1:(8-20):(200-400).

Optionally, in step b, the second silicon source is at least one selected from the group consisting of water glass, silica-alumina gel and silica-alumina sol; preferably, the molar ratio of $SiO_2/Al_2O_3$ of the silica-alumina gel is 3-30, preferably 6-16; and the molar ratio of $SiO_2/Al_2O_3$ of the silica-alumina sol is 3-30, preferably 6-16.

Optionally, in step b, the aluminum source is at least one selected from the group consisting of sodium metaaluminate, aluminum sulfate, aluminum chloride, aluminum nitrate and pseudo-boehmite.

Optionally, element aluminum from the directing agent accounts for 3-30% of the element aluminum in the second mixture, calculated as element in mol.

Optionally, in step b, the mixing is performed under stirring; while the conditions for stirring are not particularly limited, as long as homogeneous mixing is achieved.

Optionally, in step c, the conditions for the hydrothermal crystallization are not particularly limited, while conventional hydrothermal crystallization conditions known in the art may be used, as long as the NaY molecular sieve according to the present invention can be obtained. Optionally, the conditions for hydrothermal crystallization comprise, for example: a temperature of 40-100° C., preferably 90-100° C., and a duration of 10-60 hours, preferably 15-48 hours.

By the technical scheme above, the directing agent is firstly contacted with the first silicon source to form local high silicon concentration, so that the formation of crystal nuclei with high silicon atom concentration is facilitated. In the subsequent crystal grain growth, the silicon source is consumed more quickly than the aluminum source, and the silicon atom concentration is reduced more quickly, so that the silicon-aluminum ratio on the crystal nucleus surface is reduced gradually, and finally the NaY molecular sieve with an aluminum-rich surface is prepared, wherein the NaY molecular sieve has a larger framework aluminum distribution gradient from surface to center of the particle compared with conventional molecular sieves. The process provided by the present application does not need additional template agent or additive, the raw materials used are cheap and easy to obtain, the preparation can be successfully carried out by one-step hydrothermal crystallization, and the process is simple and easy to implement.

A third aspect of the present application involves: providing a modified Y molecular sieve with a mesopore-rich surface, characterized in that the modified Y molecular sieve has a molar ratio of $SiO_2/Al_2O_3$ in bulk phase of 6-20, preferably 8-15, and more preferably 10-13, and a total pore volume, by BET method, of not less than 0.35 $cm^3/g$, preferably not less than 0.38 $cm^3/g$, or not less than 0.40 $cm^3/g$; a secondary pore volume, by BET method, of not less than 0.06 $cm^3/g$, preferably not less than 0.08 $cm^3/g$, or not less than 0.09 $cm^3/g$; and cell parameters: a=b=c=2.44-2.46 nm, and the content of sodium oxide in the modified Y molecular sieve is not more than 0.1 wt %, based on the total weight of the modified Y molecular sieve.

Further, the modified Y molecular sieve may have a total pore volume, by BET method, of not more than 0.6 $cm^3/g$, preferably not more than 0.55 $cm^3/g$, or not more than 0.50 $cm^3/g$; and a secondary pore volume, by BET method, of not more than 0.4 b $cm^3/g$, preferably not more than 0.3 $cm^3/g$, or not more than 0.25 $cm^3/g$.

According to the present application, the BET method for determining the total and secondary pore volumes, as well as the method for determining the cell parameters, of a Y molecular sieve is well known to those skilled in the art, and will not be described in detail herein.

The modified Y molecular sieve according to the invention has an Al content of 15-24 wt %, preferably 16-21 wt %, calculated as $Al_2O_3$.

The modified Y molecular sieve according to the invention has an average particle size of 200-600 nm, preferably 400-500 nm.

The modified Y molecular sieve according to the invention has a specific surface area (BET method) of 640-790 $m^2/g$, preferably 690-780 $m^2/g$.

A fourth aspect of the present application involves: providing a process for preparing a modified Y molecular sieve, characterized in that the process comprises steps a, b, and c of the process of the second aspect, and d. subjecting the NaY molecular sieve obtained in the step c to reaction with ammonium to reduce the sodium content, hydrothermal treatment, and dealuminization and silica supplementation, to obtain the modified Y molecular sieve.

Optionally, in step d, the reaction with ammonium to reduce sodium content comprises: treating the NaY molecular sieve with an ammonium salt solution having an ammonium ion concentration of 0.1-1.0 mol/L, preferably 0.2-0.9 mol/L, and more preferably 0.4-0.8 mol/L, wherein the treatment comprises, but not limited to, impregnating the NaY molecular sieve obtained in the step c with the ammonium salt solution. The conditions used for this treatment comprise: a temperature from normal temperature to 100° C., preferably 50 to 100° C., and a liquid-solid weight ratio of (8 to 15):1, and a duration of 0.2 to 3 hours, preferably 0.5 to 1.5 hours. Optionally, the treatment is carried out under stirring. The ammonium salt is at least one selected from the group consisting of ammonium nitrate, ammonium sulfate, ammonium chloride and ammonium acetate.

Optionally, in step d, the hydrothermal treatment comprises: treating the NaY molecular sieve, which has been reacted with ammonium to reduce the sodium content, for 1-3 hours under the conditions of 100% of steam, a gauge pressure of 0.1-0.3 MPa, preferably 0.1-0.2 MPa, and a temperature of 400-700° C., preferably 500-650° C.

Optionally, in step d, the dealuminization and silica supplementation comprise: pulping the NaY molecular sieve which has been subjected to the hydrothermal treatment to obtain a slurry with a liquid-solid weight ratio of (3-10):1, adding $(NH_4)_2SiF_6$ to the slurry according to a dosage of 10-60 g, preferably 20-40 g, $(NH_4)_2SiF_6$ per 100 g of the NaY molecular sieve, and stirring the mixture at 80-120° C., preferably 85-99° C. for 0.5-5 hours, for example 1-3 hours, to recover the product.

By the additional step d according to the fourth aspect, the NaY molecular sieve with an aluminum-rich surface is subjected to post-treatment modification by reaction with ammonium to reduce the sodium content, hydrothermal treatment and dealuminization and silica supplementation, to obtain the modified Y molecular sieve with a mesoporous-rich surface.

Additional features and advantages of the present application will be described in more detail as follows.

DESCRIPTION OF DRAWINGS

The accompanying are comprised to provide further understanding of the invention and constitute a part of this specification, which illustrate embodiments of the application and serve to explain the application together with the description, but do not limit the application. In the drawings.

EMBODIMENTS OF THE INVENTION

Figure 1:
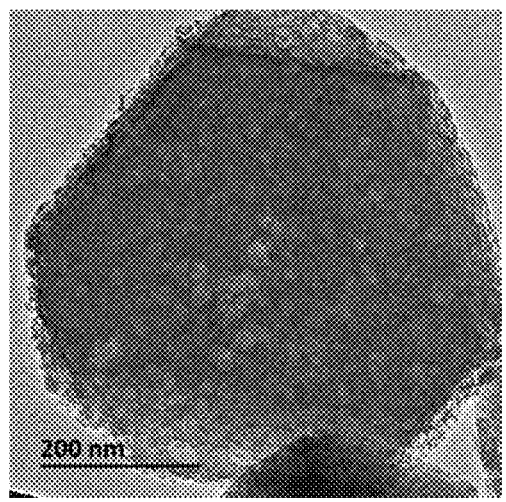
FIGS. 1-2 are TEM photographs of the modified Y molecular sieve prepared in Example 9.

The embodiments of the invention will be further illustrated below referring to the drawings. It should be understood that the embodiments are given by way of illustration and explanation only, without limitation to the invention.

All publications, patent applications, patents, and other references mentioned in this specification are herein incorporated by reference in their entirety. Unless defined otherwise, all technical and scientific terms used herein have the same meaning as commonly understood by those skilled in the art. In case of conflict, including definitions, the present specification will control.

When the specification states a material, process, component, apparatus, or device with the term of "known to those skilled in the art" or the like, the term means that the specification comprises those conventionally used in the art at the time of filing this application, and also comprises those not currently in use, but will become known in the art to be suitable for a similar purpose.

In addition, all ranges involved herein are inclusive of their endpoints unless specifically stated otherwise. Further, when a range, one or more preferred ranges, or a plurality of preferable upper and lower limits, are given for an amount, concentration, or other value or parameter, it is to be understood that all ranges formed from any pair of any upper limit or preferred values thereof and any lower limit or preferred values thereof are specifically disclosed, regardless of whether such pairs of values are individually disclosed.

In the present invention, when a technical solution is given in an open-mode such as "including", "comprising" or the like listing some elements thereof, it will be understood by those skilled in the art that an embodiment consisting of, or consisting essentially of, these elements can be obviously used to implement the technical solution. Therefore, those skilled in the art will understand that the technical solution given in the present invention in open-mode also covers the embodiments constituted by the listed elements, or substantially constituted by the listed elements.

Finally, all percentages, parts, ratios, etc. involved in this specification are indicated by weight unless explicitly stated otherwise; but where weight is not a basis according to conventional understanding by those skilled in the art, the basis is determined by conventional understanding by those skilled in the art.

The first aspect of the application involves: providing a NaY molecular sieve with an aluminum-rich surface, wherein the Al distribution index D of the molecular sieve satisfies: $1.01 \leq D \leq 10$, preferably $1.1 \leq D \leq 6$, more preferably 1.2 or $1.3 \leq D \leq 4$, wherein D=Al (S)/Al (C), Al (S) denotes the aluminum content on surface and in the region 2 to 6 nm below the surface of the molecular sieve, as measured by the XPS method, and Al (C) denotes the aluminum content of the entire molecular sieve, as measured by the XRF method. In a preferred embodiment, the molecular sieve with an aluminum-rich surface has a molar ratio of $SiO_2/Al_2O_3$ on surface of 1 to 10, preferably 2 to 8, and more preferably 2.5 to 5, and a molar ratio of $SiO_2/Al_2O_3$ in bulk phase of 2 to 20, preferably 4 to 15, and more preferably 6 to 10.

The NaY molecular sieve with an aluminum-rich surface according to the present invention has an Al content, calculated as $Al_2O_3$, of 18-26 wt %, preferably 21-25 wt %.

The NaY molecular sieve with an aluminum-rich surface according to the present invention has an average particle size of 200-600 nm, preferably 400-500 nm.

The NaY molecular sieve with an aluminum-rich surface according to the present invention has a specific surface area (BET method) of 640-790 m$^2$/g, preferably 690-780 m$^2$/g. The NaY molecular sieve with an aluminum-rich surface according to the present invention has a pore volume (BET method) of 0.34-0.50 ml/g, preferably 0.36-0.45 ml/g.

According to the present application, the meanings and test methods for the ratio of $SiO_2/Al_2O_3$ on surface and ratio of $SiO_2/Al_2O_3$ in bulk phase of the molecular sieves are well known to those skilled in the art, and the determination of the aluminum content of molecular sieves using the XPS method or the XRF method is also well known to those skilled in the art, and will not be described in detail here.

The NaY molecular sieve with an aluminum-rich surface of the present application has an aluminum distribution gradient from surface to center of the particle larger than conventional molecular sieves, as shown by the Al distribution index, D, provided by the present invention. Therefore, when a molecular sieve is prepared by the process of the present invention, the catalyst obtained after dealuminization modification is more readily to have larger mesoporous volume on the surface of the catalyst is more readily to be produced.

A second aspect of the present application involves: providing a process of preparing a NaY molecular sieve according to the first aspect of the present application, comprising the steps of:

a. Mixing a directing agent with a first silicon source to obtain a first mixture, wherein the molar composition of the directing agent is $Na_2O:Al_2O_3:SiO_2:H_2O$=(3-50):1:(3-50):(100-600), preferably (6-25):1:(6-25):(200-400);

b. Mixing the first mixture obtained in the step a with a second silicon source, an aluminum source and water, to obtain a second mixture;

c. Carrying out hydrothermal crystallization on the second mixture obtained in the step b, and collecting the solid product;

wherein, calculated as $SiO_2$, the weight ratio of the first silicon source to the second silicon source is 1:(0.001-20), preferably 1:(0.01-12).

According to the process of the invention, the directing agent is firstly contacted with the first silicon source to form local high silicon concentration, so that the formation of crystal nuclei of silicon atom with high concentration is facilitated. In the subsequent crystal grain growth, the silicon source is consumed more quickly than the aluminum source, and the silicon atom concentration is reduced more quickly, so that the silicon-aluminum ratio on the crystal nucleus surface is reduced gradually, and finally the NaY molecular sieve with an aluminum-rich surface is prepared, wherein the NaY molecular sieve has a larger framework aluminum distribution gradient from surface to center of the particle compared with conventional molecular sieves.

According to the present invention, the directing agent in step a is a conventional one well known to those skilled in the art for preparing NaY molecular sieves, which can be prepared by the procedures in the prior art. For example, the directing agent may be prepared by steps comprising: homogeneously mixing a silicon source (such as sodium silicate), an aluminum source (such as sodium metaaluminate) and optionally water according to a molar ratio of, for example, preferably (6-25)$Na_2O:Al_2O_3$:(6-25)$SiO_2$:(200-400)$H_2O$, calculated as oxides, standing for 0.5-48 hours at a temperature from room temperature to 70° C. to obtain the directing agent. In a preferred embodiment of the present application, in order to obtain a more desirable effect, the steps of preparing the directing agent comprises: mixing a directing agent aluminum source (such as sodium metaaluminate) with water glass to obtain a third mixture, and subjecting the third mixture to dynamic aging and standing aging, and then mixing with water to obtain the directing agent. Further, the dynamic aging may comprise: stirring and aging at 15-60° C. for 1-100 hours, preferably for 3-60 hours, more preferably for 5-48 hours, or 15-48 hours; and the standing aging may comprise: standing at 15-60° C. for 0.5-100 hours, preferably 3 to 60 hours, more preferably 5 to 48 hours, or 5 to 15 hours or 15 to 48 hours. The dynamic aging is beneficial to more sufficiently mixing the sodium metaaluminate with the water glass, and after standing and aging, water can be added under stirring until the required molar ratio of the directing agent is reached. The directing agent prepared according to the preferred embodiment is more beneficial to preparing the NaY molecular sieve with aluminum-rich surface.

According to the present application, in step a, the first silicon source may be various inorganic silicon sources commonly used for preparing NaY molecular sieve, and for example, may be at least one selected from the group consisting of water glass, colloidal silica and silica sol. In one embodiment of the present application, the mixing is performed under stirring. The conditions for stirring are not particularly limited, as long as homogeneous mixing is achieved. Particularly, when the first silicon source is a solid silicon source (such as colloidal silica), the mixing is preferably performed under stirring for, for example, 30 to 180 min. In this way, the solid silicon source can be better mixed with the directing agent, thereby achieving the purpose of the present application. In other embodiments of the present application, when the first silicon source is a liquid silicon source (e.g., water glass, silica sol, etc.), the mixing in step a may be a manner of mixing a directing agent with the first silicon source in a co-current flow, and may be performed under rapid stirring.

According to the present application, in step b, the second silicon source may be same as or different from the first silicon source. In order to obtain the desired effect, the second silicon source is generally a liquid silicon source, and for example, may be at least one selected from the group consisting of water glass, silica-alumina gel, and silica-alumina sol. More preferably, the molar ratio of $SiO_2/Al_2O_3$ of the silicon-aluminum gel is 3-30, preferably 6-16; the molar ratio of $SiO_2/Al_2O_3$ of the silica-alumina sol is 3-30, preferably 6-16. When the first mixture is mixed with the second silicon source, the aluminum source and water, a co-current flow mixing mode can be adopted, and the mixing can be carried out under rapid stirring. Further, a second silicon source, aluminum source, and water may be added in co-current flow with the first mixture at a location spaced further apart from the first mixture.

According to the present application, in step b, the aluminum source may be a conventional one for preparing NaY molecular sieve, for example, at least one selected from the group consisting of sodium metaaluminate, aluminum sulfate, aluminum chloride, aluminum nitrate and pseudo-boehmite. The water may be deionized or distilled water.

According to the present application, in step b, the amounts of the first mixture, the second silicon source, the aluminum source and water are not particularly limited, provided that the molar composition of the second mixture is $Na_2O:Al_2O_3:SiO_2:H_2O=(1-10):1:(5-50):(100-600)$, preferably $(2-6):1:(8-20):(200-400)$. The element aluminum from the directing agent accounts for 3-30% by mol of the element aluminum in the second mixture calculated as element. Optionally, in step b, the mixing is performed under stirring; and the conditions for stirring are not particularly limited, as long as homogeneous mixing is achieved.

According to the present application, in step c, the conditions for the hydrothermal crystallization are not particularly limited, and conventional hydrothermal crystallization conditions known in the art may be used, as long as they can result in a NaY molecular sieve required by the present invention. Optionally, the conditions for hydrothermal crystallization comprise, for example: a temperature of 40-100° C., preferably 90-100° C., and a duration of 10-60 hours, preferably 15-48 hours.

A third aspect of the present application involves: providing a modified Y molecular sieve with a mesopore-rich surface, characterized in that the modified Y molecular sieve has a molar ratio of $SiO_2/Al_2O_3$ in bulk phase of 6-20, preferably 8-15, and more preferably 10-13, and a total pore volume, by BET method, of not less than 0.35 cm$^3$/g, preferably not less than 0.38 cm$^3$/g, or not less than 0.40 cm$^3$/g; a secondary pore volume, by BET method, of not less than 0.06 cm$^3$/g, preferably not less than 0.08 cm$^3$/g, or not less than 0.09 cm$^3$/g; and cell parameters: a=b=c=2.44-2.46 nm, and the content of sodium oxide in the modified Y molecular sieve is not more than 0.1 wt %, based on the total weight of the modified Y molecular sieve.

Further, the modified Y molecular sieve may have a total pore volume, by BET method, of 0.38-0.6 cm$^3$/g, and a secondary pore volume, by BET method, of 0.06-0.4 cm$^3$/g.

According to the present application, the BET method for determining the total and secondary pore volumes, as well as the method for determining the cell parameters, of a Y molecular sieve is well known to those skilled in the art, and will not be described in detail herein.

A fourth aspect of the present application involves: providing a process for preparing a modified Y molecular sieve, characterized in that the process comprises steps a, b, and c of the process of the second aspect, and d. subjecting the NaY molecular sieve obtained in the step c to reaction with ammonium to reduce the sodium content, hydrothermal treatment, and dealuminization and silica supplementation, to obtain the modified Y molecular sieve.

According to the present application, after hydrothermal crystallization, a NaY molecular sieve can be obtained through conventional filtering, washing and drying steps, which is subjected to reaction with ammonium to reduce sodium content, hydrothermal treatment and dealuminization and silicon supplementation, so that the modified NaY molecular sieve according to the present application can be obtained.

According to the present application, in step d, the reaction with ammonium to reduce the sodium content is well known to those skilled in the art, and the objective is to reduce the sodium oxide content in the molecular sieve, for example, to 2.5 to 5.0 wt %. Specifically, the reaction with ammonium to reduce the sodium content may comprise: treating the NaY molecular sieve with an ammonium salt solution having an ammonium ion concentration of 0.1-1.0 mol/L. The treatment comprises, but not limited to, mixing the NaY molecular sieve obtained in the step c with the ammonium salt solution. The conditions used for this treatment comprise: a temperature from 50 to 100° C., a liquid-solid weight ratio of (8-15):1, and a duration of 0.5-1.5 hours. The treatment may be carried out under stirring. The ammonium salt may be at least one selected from the group consisting of ammonium nitrate, ammonium sulfate, ammonium chloride and ammonium acetate. The process of reducing the sodium content by reacting with ammonium can be performed once or multiple times using the same or different ammonium salt until the sodium oxide content of the NaY molecular sieve is brought to the target value.

According to the present application, in step d, the hydrothermal treatment and dealuminization and silicon supplementation are also well known to those skilled in the art. Specifically, the hydrothermal treatment may comprise, for example: treating the NaY molecular sieve, which has been reacted with ammonium to reduce the sodium content for, 1-3 hours under the conditions of 100% of steam, a gauge pressure of 0.1-0.2 MPa and a temperature of 500-650° C. The dealuminization and silicon supplementation may comprise, for example: pulping the NaY molecular sieve which has been subjected to the hydrothermal treatment to obtain a slurry with a liquid-solid weight ratio of (3-10):1, adding $(NH_4)_2SiF_6$ to the slurry according to a dosage of 10-60 g $(NH_4)_2SiF_6$ per 100 g of the NaY molecular sieve, and stirring the mixture at 80-120° C. for 0.5-5 hours, to recover the product. The process of recovering the product may comprise filtration and drying.

EXAMPLES

The present application will be further illustrated below by reference to Examples and Comparative Examples, but the scope of the present application is not limited to only these Examples.

In each of the Examples and Comparative Examples, the relative crystallinity of NaY molecular sieve was determined using a SIMADU XRD6000 type X-ray diffractometer under the experimental conditions of: CuKa radiation, tube pressure 40 kv, and tube current 40 mA. The relative crystallinity was determined according to SH/T0340-92 standard method (*Compiled Standards of Chemical Industry*, published by Standards Press of China, 2000).

The molar ratio of $SiO_2/Al_2O_3$ on surface of the molecular sieve was measured by an XPS method, which method was also used for measuring the aluminum content on the surface and in the region 2-6 nm below the surface of a sample (Al (S)). The test instrument was a Perkin-Elmer PHI 5000 ESCA Systemm X-ray photoelectron spectrometer, wherein Al K α (1486.6 eV) was used as a light source, and the pressure for analysis chamber was less than $10^{-7}$ Pa during measurement. The sample was etched with Ar+ ion for 15 min prior to measurement to remove oxides generated during sample processing. The binding energies of all elements were corrected with contaminated carbon (EC16=284.6 eV), and the specific test method was described in "*Chinese Journal of Catalysis*", 11 (2), 1993: 127.

The molar ratio of $SiO_2/Al_2O_3$ in bulk phase of the molecular sieves and the overall aluminum content of the molecular sieves, i.e., Al (C), were determined using X-ray fluorescence spectroscopy (XRF). The test apparatus was a 3271E model X-ray fluorescence spectrometer manufactured by Rigaku Industrial Corporation, Japan. The test process comprised: a rhodium target, an excitation voltage of 50 kV, and an excitation current of 50 mA, in which a scintillation counter and a proportional counter were used for detecting the spectral line intensity of each element, and the content of the sample $SiO_2$ and the content of $Al_2O_3$ were quantitatively analyzed.

The unit cell parameters of the molecular sieve were determined according to SH/T0339-92 standard method (*Compiled Standards of Chemical Industry*, published 2000, Standards Press of China).

The specific surface area and the pore structure of the molecular sieve were measured using an ASAP2420 type automatic adsorption apparatus and an ASAP2020 type automatic adsorption apparatus from Micromeritics Instruments Corporation, America, and the total pore volume and the secondary pore volume of the molecular sieve were calculated according to a BET method, comprising the specific steps of: the BET specific surface area being specified in the range of 0.05-0.35 of nitrogen partial pressure, 3-5 pressures being selected, the actual nitrogen adsorption amount being measured, and then the specific surface area being calculated by applying a BET equation. According to the t-plot curve, the micropore volume and the total pore volume were calculated, wherein the secondary pore volume was calculated by a BJH equation.

The morphology and grain size of the molecular sieve were determined by electron microscopy. The instrument model of a Scanning Electron Microscope (SEM) was Hitachi S-4300, the accelerating voltage was 10 kV, the accessory was provided with an Energy Dispersive Spectroscopy (EDS), and a layer of gold was plated on the surface of the sample before testing. The catalyst was observed by a FEI Tecnai G2F 20 field emission transmission electron microscope, using a suspension method to prepare a sample, dispersing the catalyst sample with absolute ethyl alcohol, homogeneously shaking, dripping the mixture on a copper net, and observing after the ethyl alcohol was completely volatilized.

The sodium oxide content of the molecular sieve was determined by X-ray fluorescence spectroscopy (XRF). The test apparatus was a 3271E model X-ray fluorescence spectrometer manufactured by Rigaku Industrial Corporation, Japan. The test process comprised: a rhodium target, an excitation voltage of 50 kV, and an excitation current of 50 mA, in which scintillation counter and a proportional counter were used for detecting the spectral line intensity of each element, and quantitative or semi-quantitative analysis was carried out.

Some of the raw materials used in the examples and Comparative Examples were as follows:

The high-alkaline sodium metaaluminate solution was provided by Sinopec Changling Refining & Chemical Company, having a $Al_2O_3$ content of 40.2 g/L, a $Na_2O$ content of 255 g/L, and a specific gravity of 1.324; the water glass was provided by Sinopec Changling Refining & Chemical Company, having a $SiO_2$ content of 260.6 g/L, a $Na_2$ O content of 81.6 g/L, and a specific gravity of 1.2655, and modulus was 3.3; the colloidal silica was provided by Sinopharm Chemical Reagent Co., Ltd, having a $SiO_2$ content of ≥90%; the low-alkaline sodium metaaluminate solution was provided by Sinopec Changling Refining & Chemical Company, having a $Al_2O_3$ content of 194 g/L, a $Na_2O$ content of 286.2 g/L, and a specific gravity of 1.413; the aluminum sulfate was provided by Sinopec Changling Refining & Chemical Company, having a $Al_2O_3$ content of 88.9 g/L, and a specific gravity of 1.2829; the alkaline silica sol was provided by Sinopharm Chemical Reagent Co., Ltd, in ammonium type, having a $NaO_2$ content of 0.2-0.4%, a pH value of 9-10, and a $SiO_2$ content of 40%; the silicon-aluminum gel A was provided by Sinopharm Chemical Reagent Co., Ltd, having a $SiO_2$ content of 90%, a $Al_2O_3$ content of 10%, and a molar ratio of $SiO_2/Al_2O_3$ of 15.3; and the silicon-aluminum gel B was provided by Sinopharm Chemical Reagent Co., Ltd, having a $SiO_2$ content of 85%, a $Al_2O_3$ content of 15%, and a molar ratio of $SiO_2/Al_2O_3$ of 9.6.

Examples 1-8 were presented to illustrate NaY molecular sieve prepared according to steps a-c of the process of the second aspect of the present application.

Example 1

642.44 g of high-alkaline sodium metaaluminate solution was added into 866.51 g of water glass, the mixture was stirred for dynamic aging for 48 hours at room temperature of 20° C., then the mixture was kept stand and aged for 5 hours at 60° C., and finally 195 g of deionized water was added under the stirring, so as to provide a directing agent having a molar composition of $15Na_2O:Al_2O_3:15SiO_2:320H_2O$.

348.4 g of the directing agent above and 12.63 g of a first silicon source of colloidal silica were mixed under high-speed stirring (rotating at 900 r/min) at room temperature, and stirring was continued for 30 min to obtain a first mixture. Then the first mixture, 508.14 g of a second silicon source of water glass, 43.10 g of an aluminum source of low-alkaline sodium metaaluminate solution, 286.5 g of an aluminum source of aluminum sulfate and 166.5 g of water were added into a mixing tank in co-current flow also under high-speed stirring at room temperature to obtain a second mixture having a molar composition of 2.7Na$_2$O:Al$_2$O$_3$: 8.6SiO$_2$:259H$_2$O. The weight ratio of the first silicon source to the second silicon source was 1:8.3, and the directing agent was added in such an amount that the moles of the element aluminum in the directing agent accounts for 15% of the moles of the element aluminum in the second mixture. After being stirred homogeneously, the mixture was put into a stainless steel reactor and was statically crystallized for 24 hours at the temperature of 100° C., and then the NaY molecular sieve product A1 was obtained after filtration, washing and drying. The results of the relative crystallinity and other parameters of the product were shown in Table 1.

Example 2

642.44 g of high-alkaline sodium metaaluminate solution was mixed with 866.51 g of water glass, the mixture was stirred for dynamic aging for 48 hours at room temperature of 20° C., then the mixture was kept stand and aged for 5 hours at 60° C., and finally 195 g of deionized water was added under the stirring, so as to provide a directing agent having a molar composition was 15Na$_2$O:Al$_2$O$_3$:15SiO$_2$: 320H$_2$O.

311.6 g of the directing agent above and 12.63 g of a first silicon source of colloidal silica were mixed under high-speed stirring (rotating at 900 r/min) at room temperature, and stirring was continued for 60 min to obtain a first mixture. Then the first mixture, 441.37 g of a second silicon source of water glass, 40.00 g of an aluminum source of low-alkaline sodium metaaluminate solution, 251.00 g of an aluminum source of aluminum sulfate and 200.63 g of water were added into a mixing tank in co-current flow also under high-speed stirring at room temperature to obtain a second mixture having a molar composition of 2.7Na$_2$O:Al$_2$O$_3$: 8.6SiO$_2$:269H$_2$O. The weight ratio of the first silicon source to the second silicon source was 1:7.1 calculated as SiO$_2$, and the directing agent was added in such an amount that the moles of the element aluminum in the directing agent accounts for 15% of the moles of the element aluminum in the second mixture. After being stirred homogeneously, the mixture was put into a stainless steel reactor and was statically crystallized for 24 hours at a temperature of 100° C., and then the NaY molecular sieve product A2 was obtained after filtration, washing and drying. The results of the relative crystallinity and other parameters of the product were shown in Table 1.

Example 3

164.54 g of high-alkaline sodium metaaluminate solution was mixed with 291.37 g of water glass, the mixture was stirred for dynamic aging for 20 hours at 30° C., then the mixture was kept stand and aged for 15 hours at 40° C., and finally 60 g of deionized water was added under the stirring, so as to provide a directing agent having a molar composition of 20Na$_2$O:Al$_2$O$_3$:20SiO$_2$:380H$_2$O.

515.91 g of the directing agent above and 592.62 g of a first silicon source of water glass were mixed in co-current flow under high-speed stirring (rotating at 900 r/min) at room temperature, to obtain a first mixture. Then 500 g of a second silicon source of water glass, 166.31 g of an aluminum source of low-alkaline sodium metaaluminate solution, 332.87 g of an aluminum source of aluminum sulphate and 479.4 g of water were added in co-current flow at a point spaced far from the first mixture under rapid stirring (rotating at 900 r/min) to give a mixture having a molar composition of 4Na$_2$O:Al$_2$O$_3$:9SiO$_2$:220H$_2$O. The weight ratio of the first silicon source to the second silicon source was 1:0.83 calculated as SiO$_2$, and the directing agent was added in such an amount that the moles of the element aluminum in the directing agent accounts for 10% of the moles of the element aluminum in the second mixture. After being stirred homogeneously, the mixture was put into a stainless steel reactor and was statically crystallized for 24 hours at a temperature of 95° C., and then the NaY molecular sieve product A3 was obtained after filtration, washing and drying. The results of the relative crystallinity and other parameters of the product were shown in Table 1.

Example 4

251.76 g of high-alkaline sodium metaaluminate solution was mixed with 349.64 g of water glass, the mixture was stirred for dynamic aging for 15 hours at 40° C., then the mixture was kept stand and aged for 20 hours at 15° C., and finally 78 g of deionized water was added under the stirring, so as to provide a directing agent having a molar composition of 6Na$_2$O:Al$_2$O$_3$:16SiO$_2$:290H$_2$O.

679.4 g of the directing agent above and 1000 g of a first silicon source of water glass were mixed in co-current flow under high-speed stirring at room temperature, to obtain a first mixture. Then the first mixture, 129.04 g of a second silicon source water glass, 55.90 g of an aluminum source of low-alkaline sodium metaaluminate solution, 514.81 g of an aluminum source of aluminum sulfate and 489.2 g of water were added into a mixing tank in sequence to obtain a second mixture having a molar composition of 3Na$_2$O: Al$_2$O$_3$:10SiO$_2$:250H$_2$O. The weight ratio of the first silicon source to the second silicon source was 1:0.13 calculated as SiO$_2$, and the directing agent was added in such an amount that the moles of the element aluminum in the directing agent accounts for 15% of the moles of the element aluminum in the second mixture. After being stirred homogeneously, the mixture was put into a stainless steel reactor and was statically crystallized for 36 hours at the temperature of 95° C., and then the NaY molecular sieve product A4 was obtained after filtration, washing and drying. The results of the relative crystallinity and other parameters of the product were shown in Table 1.

Example 5

642.44 g of high-alkaline sodium metaaluminate solution was added to 866.51 g of water glass, the mixture was stirred for dynamic aging for 48 hours at room temperature of 20° C., then the mixture was kept stand and aged for 5 hours at 60° C., and finally 195 g of deionized water was added under the stirring, so as to provide a directing agent having a molar composition of 15Na$_2$O:Al$_2$O$_3$:15SiO$_2$:320H$_2$O.

348.4 g of the directing agent above and 31.57 g of a first silicon source of alkaline silica sol were mixed under high-speed stirring at room temperature, to obtain a first mixture. Then 508.14 g of a second silicon source of water glass, 43.10 g of an aluminum source of low-alkaline sodium metaaluminate solution, 286.5 g of an aluminum source of aluminum sulphate and 147.55 g of water were added in co-current flow at a point spaced far from the first mixture under rapid stirring (rotating at 900 r/min) to give a mixture having a molar composition of 2.7Na$_2$O:Al$_2$O$_3$: 8.6SiO$_2$:259H$_2$O. The weight ratio of the first silicon source to the second silicon source was 1:10.9 calculated as SiO$_2$, and the directing agent was added in such an amount that the moles of the element aluminum in the directing agent accounts for 15% of the moles of the element aluminum in the second mixture. After being stirred homogeneously, the mixture was put into a stainless steel reactor and was statically crystallized for 24 hours at a temperature of 100° C., and then the NaY molecular sieve product A5 was obtained after filtration, washing and drying. The results of the relative crystallinity and other parameters of the product were shown in Table 1.

Example 6

642.44 g of high-alkaline sodium metaaluminate solution was mixed with 866.51 g of water glass, the mixture was stirred for dynamic aging for 48 hours at room temperature of 20° C., then the mixture was kept stand and aged for 5 hours at 60° C., and finally 195 g of deionized water was added under the stirring, so as to provide a directing agent having a molar composition of $15Na_2O:Al_2O_3:15SiO_2:320H_2O$.

311.6 g of the directing agent above, 6.63 g of a first silicon source of colloidal silica and 15 g of alkaline silica sol were mixed under high-speed stirring (rotating at 900 r/min) at room temperature, and stirred for 170 min under a rotating speed of 900 r/min to obtain a first mixture. Then the first mixture, 441.37 g of a second silicon source of water glass, 40 g of an aluminum source of low-alkaline sodium metaaluminate solution, 251 g of an aluminum source of aluminum sulfate and 191.63 g of water were added into a mixing tank in co-current flow also under high-speed stirring (with a rotating speed of 900 r/min) at room temperature to obtain a second mixture having a molar composition of $2.7Na_2O:Al_2O_3:8.6SiO_2:269H_2O$. The weight ratio of the first silicon source to the second silicon source was 1:8.1 calculated as $SiO_2$, and the directing agent was added in such an amount that the moles of the element aluminum in the directing agent accounts for 15% of the moles of the element aluminum in the second mixture. After being stirred homogeneously, the mixture was put into a stainless steel reactor and was statically crystallized for 24 hours at a temperature of 100° C., and then the NaY molecular sieve product A6 was obtained after filtration, washing and drying. The results of the relative crystallinity and other parameters of the product were shown in Table 1.

Example 7

251.76 g of high-alkaline sodium metaaluminate solution was added to 349.64 g of water glass, the mixture was stirred for dynamic aging for 48 hours at room temperature of 20° C., then the mixture was kept stand and aged for 5 hours at 60° C., and finally 78 g of deionized water was added under the stirring, so as to provide a directing agent having a molar composition of $16Na_2O:Al_2O_3:16SiO_2:290H_2O$.

679.4 g of the directing agent above and 1000 g of a first silicon source of water glass were mixed in co-current flow under high-speed stirring (rotating at 900 r/min) at room temperature, to obtain a first mixture. Then 29.36 g of a second silicon source of silica-alumina gel A, 62.41 g of an aluminum source of low-alkaline sodium metaaluminate solution, 533.44 g of an aluminum source of aluminum sulphate and 479. g of water were added in co-current flow at a point spaced far from the first mixture under rapid stirring (rotating at 1200 r/min) to give a mixture having a molar composition of $3Na_2O:Al_2O_3:10SiO_2:250H_2O$. The weight ratio of the first silicon source to the second silicon source was 1:0.13 calculated as $SiO_2$, and the directing agent was added in such an amount that the moles of the element aluminum in the directing agent accounts for 15% of the moles of the element aluminum in the second mixture. After being stirred homogeneously, the mixture was put into a stainless steel reactor and was statically crystallized for 24 hours at the temperature of 95° C., and then the NaY molecular sieve product A7 was obtained after filtration, washing and drying. The results of the relative crystallinity and other parameters of the product were shown in Table 1.

Example 8

A NaY molecular sieve was prepared following the process in Example 7, except that the silica-alumina gel A was replaced with a same amount of silica-alumina gel B. The test results of the relative crystallinity and other parameters of the prepared NaY molecular sieve product A8 were listed in Table 1.

Comparative Examples 1-6 were presented to illustrate the process in which the

Comparative Example 1

348.4 g of a directing agent same as that in Example 1, 12.63 g of colloidal silica, 508.14 g of a silicon source of water glass, 43.10 g of an aluminum source of low-alkaline sodium metaaluminate solution, 286.5 g of an aluminum source of aluminum sulfate and 166.5 g of water were added to a mixing tank at room temperature under high speed stirring to give a reaction mixture having a molar composition of $2.7Na_2O:Al_2O_3:8.6SiO_2:259H_2O$. After being stirred homogeneously, the mixture was put into a stainless steel reactor and was statically crystallized for 24 hours at a temperature of 100° C., and then a NaY molecular sieve product B1 was obtained after filtration, washing and drying. The results of the relative crystallinity and other parameters of the product were shown in Table 1.

Comparative Example 2

348.4 g of a directing agent same as that in Example 1, 508.14 g of water glass, 43.10 g of low-alkaline sodium metaaluminate solution, 286.5 g of aluminum sulfate and 166.5 g of water were added in co-current flow to a mixing tank at room temperature under high speed stirring. After being stirred homogeneously, the mixture above was further mixed homogeneously with 12.63 g of colloidal silica also at room temperature under high speed stirring, to give a reaction mixture having a molar composition of $2.7Na_2O:Al_2O_3:8.6SiO_2:259H_2O$. After being stirred homogeneously, the mixture was put into a stainless steel reactor and was statically crystallized for 24 hours at a temperature of 100° C., and then a NaY molecular sieve product B2 was obtained after filtration, washing and drying. The results of the relative crystallinity and other parameters of the product were shown in Table 1.

Comparative Example 3

515.9 g of a directing agent (same as in Example 3), 166.31 g of low-alkaline sodium metaaluminate solution, 332.87 g of aluminum sulphate, 1092.62 g of water glass and 479.4 g of water were added in sequence to a mixing tank at room temperature under high speed stirring to give a mixture having a molar composition of $4Na_2O:Al_2O_3:9SiO_2:220H_2O$. After being stirred homogeneously, the mixture was put into a stainless steel reactor and was statically crystallized for 24 hours at a temperature of 95° C., and then a NaY molecular sieve product B3 was obtained after filtration, washing and drying. The results of the relative crystallinity and other parameters of the product were shown in Table 1.

Comparative Example 4

1129.04 g of water glass, 55.90 g of low-alkaline sodium metaluminate solution, 514.81 g of aluminum sulfate, 679.4 g of a directing agent (same as in Example 4) and 489.2 g of water were added in sequence to a mixing tank at room temperature under high speed stirring, to give a reaction mixture having a molar composition of $3Na_2O:Al_2O_3:10SiO_2:250H_2O$. After being stirred homogeneously, the mixture was put into a stainless steel reactor and was statically crystallized for 24 hours at a temperature of 95° C., and then a NaY molecular sieve product B4 was obtained after filtration, washing and drying. The results of the relative crystallinity and other parameters of the product were shown in Table 1.

Comparative Example 5

348.4 g of a directing agent (same as in example 5), 43.10 g of low-alkaline sodium metaaluminate solution, 286.5 g of aluminum sulphate, 31.57 g of alkaline silica sol, 508.14 g of water glass and 147.55 g of water were added simultaneously to a mixing tank at room temperature under high speed stirring to give a mixture having a molar composition of $2.7Na_2O:Al_2O_3:8.6SiO_2:259H_2O$. After being stirred homogeneously, the mixture was put into a stainless steel reactor and was statically crystallized for 24 hours at a temperature of 95° C., and then a NaY molecular sieve product B5 was obtained after filtration, washing and drying. The results of the relative crystallinity and other parameters of the product were shown in Table 1.

Comparative Example 6

311.6 g of a directing agent (same as in example 6), 441.37 g of water glass, 40 g of a low-alkaline sodium metaaluminate solution, 251 g of aluminum sulfate, 6.63 g of colloidal silica, 15 g of alkaline silica sol and 191.63 g of water were simultaneously added to a mixing tank at room temperature under high speed stirring to give a mixture having a molar composition of $2.7Na_2O:Al_2O_3:8.6SiO_2:269H_2O$. After being stirred homogeneously, the mixture was put into a stainless steel reactor and was statically crystallized for 48 hours at a temperature of 90° C., and then a NaY molecular sieve product B6 was obtained after filtration, washing and drying. The results of the relative crystallinity and other parameters of the product were shown in Table 1.

TABLE 1

| Ex. | relative crystallinity, % | Molar ratio of $SiO_2/Al_2O_3$ on surface | Molar ratio of $SiO_2/Al_2O_3$ in bulk phase | Al distribution index, D |
| --- | --- | --- | --- | --- |
| Ex. 1 | 93.7 | 4.9 | 6.6 | 1.35 |
| Ex. 2 | 94.2 | 2.6 | 7.3 | 2.78 |
| Ex. 3 | 95.1 | 2.8 | 10.0 | 3.57 |
| Ex. 4 | 97.6 | 3.5 | 8.0 | 2.27 |
| Ex. 5 | 93.5 | 3.6 | 6.1 | 1.69 |
| Ex. 6 | 93.9 | 3.2 | 6.8 | 2.13 |
| Ex. 7 | 94.8 | 4.7 | 7.9 | 1.67 |
| Ex. 8 | 93.2 | 4.9 | 7.2 | 1.47 |

TABLE 1-continued

| Ex. | relative crystallinity, % | Molar ratio of $SiO_2/Al_2O_3$ on surface | Molar ratio of $SiO_2/Al_2O_3$ in bulk phase | Al distribution index, D |
| --- | --- | --- | --- | --- |
| C. Ex. 1 | 89.7 | 5.4 | 5.0 | 0.92 |
| C. Ex. 2 | 88.5 | 5.6 | 4.9 | 0.88 |
| C. Ex. 3 | 90.2 | 5.1 | 5.3 | 0.95 |
| C. Ex. 4 | 90.8 | 5.4 | 5.2 | 0.97 |
| C. Ex. 5 | 89.6 | 5.6 | 5.1 | 0.91 |
| C. Ex. 6 | 90.3 | 5.2 | 5.2 | 1.00 |

As can be seen from table 1, NaY molecular sieves prepared using the process of the present application were rich in aluminum on the surface, with a larger aluminum distribution gradient from surface to center of the particle compared with conventional molecular sieves.

Examples 9-16 were presented to illustrate modified Y molecular sieves obtained by reacting the NaY molecular sieves prepared in Examples 1-8 with ammonium to reduce the sodium content, hydrothermal treatment, and dealuminization and silica supplementation according to step d of the process of the fourth aspect of the present application.

Example 9

Figure 2:
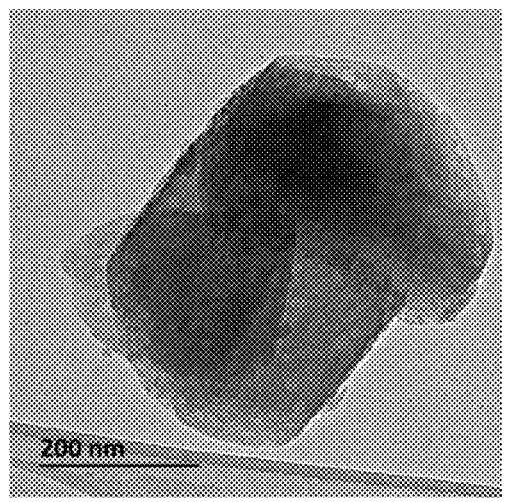

The sample A1 obtained in Example 1 was subjected to reaction with ammonium to reduce sodium content, hydrothermal treatment, and dealuminization and silicon supplementation to obtain a modified Y molecular sieve with a surface rich in mesopores, comprising the steps of:

10 L of ammonium nitrate aqueous solution with a concentration of 0.5 mol/L was prepared, 1000 g of A1 molecular sieve was weighed and put into 10 L of the prepared ammonium nitrate aqueous solution, with stirring at a rotating speed of 300 rpm, stirred at a constant temperature of 90° C. for 1 hour, then the molecular sieve was filtered, and the operation was repeated until the content of $Na_2O$ in the molecular sieve reached 4.5 wt %. The dried sample was subjected to hydrothermal treatment at 500° C. under a 100% steam and a gauge pressure of 0.1 MPa for 1.5 hours. Then 1 L of deionized water was taken, 200 g of the sample was put into the deionized water, rapidly heated and stirred at a temperature of 95° C. with a stirring speed of 300 rpm. An ammonium hexafluorosilicate aqueous solution was added rapidly into the molecular sieve slurry, through which 50 g in total of ammonium hexafluorosilicate was added, then stirred at a constant temperature and a constant speed for 2 hours, filtered and dried to obtain the modified NaY molecular sieve. The product was numbered as NY-1, the properties thereof being listed in Table 2, and a TEM photograph being shown in FIGS. 1-2, from which a mesoporous structure was seen for the modified NaY molecular sieve.

Example 10

The sample A2 obtained in Example 2 was subjected to reaction with ammonium to reduce sodium content, hydrothermal treatment, and dealuminization and silicon supplementation to obtain the modified Y molecular sieve with a surface rich in mesopores, comprising the steps of:

10 L of ammonium sulfate aqueous solution with a concentration of 0.2 mol/L was prepared, 1000 g of A2 molecular sieve was weighed and put into 10 L of the prepared ammonium nitrate aqueous solution, with stirring at a rotating speed of 300 rpm, stirred at a constant temperature of 90° C. for 1 hour, then the molecular sieve was filtered, and the operation was repeated until the content of Na$_2$O in the molecular sieve reached 5.0 wt %. The dried sample was subjected to hydrothermal treatment at 570° C. under a 100% steam and a gauge pressure of 0.2 MPa for 2.0 h. Then 1 L of deionized water was taken, 300 g of the sample was put into the deionized water, rapidly heated and stirred at a temperature of 80° C. with a stirring speed of 300 rpm. An ammonium hexafluorosilicate aqueous solution was added rapidly into the molecular sieve slurry, through which 50 g in total of ammonium hexafluorosilicate was added, then stirred at a constant temperature and a constant speed for 2 hours, filtered and dried to obtain the modified Y molecular sieve. The product was numbered as NY-2, the properties thereof being listed in Table 2.

Example 11

The sample A3 obtained in Example 3 was subjected to reaction with ammonium to reduce sodium content, hydrothermal treatment, and dealuminization and silicon supplementation to obtain the modified Y molecular sieve with a surface rich in mesopores, comprising the steps of:

10 L of ammonium chloride aqueous solution with a concentration of 0.5 mol/L was prepared, 1000 g of A3 molecular sieve was weighed and put into 10 L of the prepared ammonium nitrate aqueous solution, with stirring at a rotating speed of 300 rpm, stirred at a constant temperature of 90° C. for 1 hour, then the molecular sieve was filtered, and the operation was repeated until the content of Na$_2$O in the molecular sieve reached 2.5-5 wt %. The dried sample was subjected to hydrothermal treatment at 550° C. under a 100% steam and a gauge pressure of 0.2 MPa for 2.5 h. Then 1 L of deionized water was taken, 100 g of the sample was put into the deionized water, rapidly heated and stirred at a temperature of 95° C. with a stirring speed of 300 rpm. An ammonium hexafluorosilicate aqueous solution was added rapidly into the molecular sieve slurry, through which 60 g in total of ammonium hexafluorosilicate was added, then stirred at a constant temperature and a constant speed for 2 hours, filtered and dried to obtain the modified Y molecular sieve. The product was numbered as NY-3, the properties thereof being listed in Table 2.

Example 12

The sample A4 obtained in Example 4 was subjected to reaction with ammonium to reduce sodium content, hydrothermal treatment, and dealuminization and silicon supplementation to obtain the modified Y molecular sieve with a surface rich in mesopores, comprising the steps of:

10 L of ammonium nitrate aqueous solution with a concentration of 0.7 mol/L was prepared, 1000 g of A4 molecular sieve was weighed and put into 10 L of the prepared ammonium nitrate aqueous solution, with stirring at a rotating speed of 300 rpm, stirred at a constant temperature of 90° C. for 1 hour, then the molecular sieve was filtered, and the operation was repeated until the content of Na$_2$O in the molecular sieve reached 4.0 wt %. The dried sample was subjected to hydrothermal treatment at 600° C. under a 100% steam and a gauge pressure of 0.1 MPa for 1.0 h. Then 1 L of deionized water was taken, 200 g of the sample was put into the deionized water, rapidly heated and stirred at a temperature of 95° C. with a stirring speed of 300 rpm. An ammonium hexafluorosilicate aqueous solution was added rapidly into the molecular sieve slurry, through which 50 g in total of ammonium hexafluorosilicate was added, then stirred at a constant temperature and a constant speed for 2 hours, filtered and dried to obtain the modified Y molecular sieve. The product was numbered as NY-4, the properties thereof being listed in Table 2.

Example 13

The sample A5 obtained in Example 5 was subjected to reaction with ammonium to reduce sodium content, hydrothermal treatment, and dealuminization and silicon supplementation to obtain the modified Y molecular sieve with a surface rich in mesopores, comprising the steps of:

10 L of ammonium nitrate aqueous solution with a concentration of 0.7 mol/L was prepared, 1000 g of A5 molecular sieve was weighed and put into 10 L of the prepared ammonium nitrate aqueous solution, with stirring at a rotating speed of 300 rpm, stirred at a constant temperature of 90° C. for 1 hour, then the molecular sieve was filtered, and the operation was repeated until the content of Na$_2$O in the molecular sieve reached 3.0 wt %. The dried sample was subjected to hydrothermal treatment at 600° C. under a 100% steam and a gauge pressure of 0.1 MPa for 1.0 h. Then 1 L of deionized water was taken, 200 g of the sample was put into the deionized water, rapidly heated and stirred at a temperature of 95° C. with a stirring speed of 300 rpm. An ammonium hexafluorosilicate aqueous solution was added rapidly into the molecular sieve slurry, through which 60 g in total of ammonium hexafluorosilicate was added, then stirred at a constant temperature and a constant speed for 2 hours, filtered and dried to obtain the modified Y molecular sieve. The product was numbered as NY-5, the properties thereof being listed in Table 2.

Example 14

The sample A6 obtained in Example 6 was subjected to reaction with ammonium to reduce sodium content, hydrothermal treatment, and dealuminization and silicon supplementation to obtain the modified Y molecular sieve with a surface rich in mesopores, comprising the steps of:

10 L of ammonium nitrate aqueous solution with a concentration of 0.7 mol/L was prepared, 1000 g of A6 molecular sieve was weighed and put into 10 L of the prepared ammonium nitrate aqueous solution, with stirring at a rotating speed of 300 rpm, stirred at a constant temperature of 90° C. for 1 hour, then the molecular sieve was filtered, and the operation was repeated until the content of Na$_2$O in the molecular sieve reached 4.5 wt %. The dried sample was subjected to hydrothermal treatment at 600° C. under a 100% steam and a gauge pressure of 0.1 MPa for 1.0 h. Then 1 L of deionized water was taken, 200 g of the sample was put into the deionized water, rapidly heated and stirred at a temperature of 95° C. with a stirring speed of 300 rpm. An ammonium hexafluorosilicate aqueous solution was added rapidly into the molecular sieve slurry, through which 60 g in total of ammonium hexafluorosilicate was added, then stirred at a constant temperature and a constant speed for 2 hours, filtered and dried to obtain the modified Y molecular sieve. The product was numbered as NY-6, the properties thereof being listed in Table 2.

Examples 15 to 16

The samples obtained in Examples 7-8 were subjected to ammonium reaction to reduce sodium content, hydrothermal treatment, and dealuminization and silicon supplementation according to the process in Example 9 to obtain modified Y molecular sieves with a surface rich in mesopores. The modified Y molecular sieves were numbered as NY-7 and NY-8, and the properties thereof were listed in Table 2.

Comparative Example 7

The sample obtained in Comparative Example 1 was subjected to ammonium reaction to reduce the sodium content, hydrothermal treatment, and dealuminization and silicon supplementation according to the process of Example 9 to obtain a comparative product, numbered as DB-1, properties of there being shown in Table 2, and a TEM content, hydrothermal treatment, and dealuminization and silicon supplementation according to the process of Example 13 to obtain a comparative product, numbered as DB-5, properties thereof being shown in Table 2.

Comparative Example 12

The sample obtained in Comparative Example 6 was subjected to ammonium reaction to reduce the sodium content, hydrothermal treatment, and dealuminization and silicon supplementation according to the process of Example 14 to obtain a comparative product, numbered as DB-6, properties thereof being shown in Table 2.

TABLE 2

Figure 3:
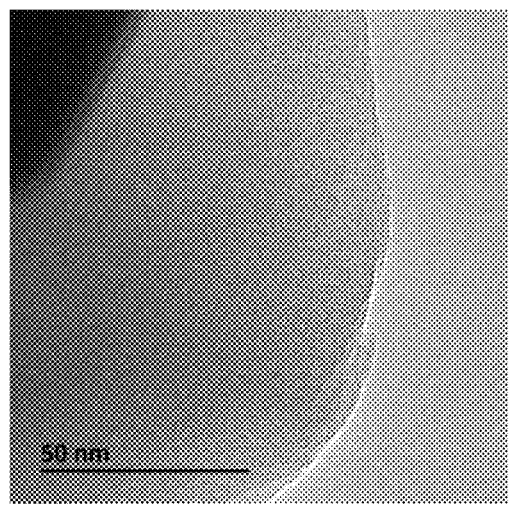
FIG. 3 is a TEM photograph of the Y molecular sieve prepared in Comparative Example

| Ex. No. | Sample No. | Molar ratio of $SiO_2/Al_2O_3$ in bulk phase | Total pore volume/(cm$^3$/g) | Secondary pore volume/(cm$^3$/g) | Cell parameter | $Na_2O$ content, wt % |
|---|---|---|---|---|---|---|
| Ex. 9 | NY-1 | 10.6 | 0.41 | 0.092 | 2.442 | 0.030 |
| Ex. 10 | NY-2 | 11.7 | 0.45 | 0.19 | 2.447 | 0.036 |
| Ex. 11 | NY-3 | 12.8 | 0.39 | 0.095 | 2.450 | 0.055 |
| Ex. 12 | NY-4 | 12.5 | 0.39 | 0.097 | 2.457 | 0.042 |
| Ex. 13 | NY-5 | 11.1 | 0.42 | 0.14 | 2.459 | 0.021 |
| Ex. 14 | NY-6 | 10.3 | 0.41 | 0.17 | 2.458 | 0.026 |
| Ex. 15 | NY-7 | 11.7 | 0.38 | 0.13 | 2.452 | 0.015 |
| Ex. 16 | NY-8 | 11.6 | 0.40 | 0.15 | 2.456 | 0.038 |
| C. Ex. 7 | DB-1 | 6.2 | 0.32 | 0.031 | 2.446 | 0.29 |
| C. Ex. 8 | DB-2 | 5.3 | 0.27 | 0.034 | 2.447 | 0.28 |
| C. Ex. 9 | DB-3 | 6.0 | 0.21 | 0.027 | 2.449 | 0.38 |
| C. Ex. 10 | DB-4 | 5.9 | 0.22 | 0.030 | 2.442 | 0.14 |
| C. Ex. 11 | DB-5 | 5.8 | 0.25 | 0.032 | 2.443 | 0.18 |
| C. Ex. 12 | DB-6 | 5.8 | 0.26 | 0.033 | 2.447 | 0.22 | photograph thereof being shown in FIG. 3, from which no mesoporous structure was found.

Comparative Example 8

The sample obtained in Comparative Example 2 was subjected to ammonium reaction to reduce the sodium content, hydrothermal treatment, and dealuminization and silicon supplementation according to the process of Example 9 to obtain a comparative product, numbered as DB-2, properties thereof being shown in Table 2.

Comparative Example 9

The sample obtained in Comparative Example 3 was subjected to ammonium reaction to reduce the sodium content, hydrothermal treatment, and dealuminization and silicon supplementation according to the process of Example 11 to obtain a comparative product, numbered as DB-3, properties thereof being shown in Table 2.

Comparative Example 10

The sample obtained in Comparative Example 4 was subjected to ammonium reaction to reduce the sodium content, hydrothermal treatment, and dealuminization and silicon supplementation according to the process of Example 12 to obtain a comparative product, numbered as DB-4, properties thereof being shown in Table 2.

Comparative Example 11

The sample obtained in Comparative Example 5 was subjected to ammonium reaction to reduce the sodium The preferred embodiments of the present application have been described in detail above with reference to the drawings, however, the present application is not limited to the specific details in the above embodiments, and various simple modifications may be made to the technical solution of the present application within the technical idea of the present application, and these simple modifications all belong to the protection scope of the present application.

It should be noted that, in the above embodiments, the various specific features described in the above embodiments may be combined in any suitable manner in case of non-conflicting, and in order to avoid unnecessary repetition, various possible combinations are not be further described in the present application.

In addition, any combination among various embodiments of the present application may be made, which combinations should be also considered as the disclosure of the present application as long as it does not depart from the gist of the present application.

The invention claimed is:

1. A NaY molecular sieve having a surface that is aluminum-enriched, wherein an Al distribution index, D, of the molecular sieve satisfies: $1.01 \leq D \leq 10$, wherein:

$D = Al(S)/Al(C)$,

Al (S) denotes an aluminum content on the surface and in a region 2 to 6 nm below the surface of the molecular sieve, as measured by an XPS method, and
   Al (C) denotes an aluminum content of the molecular sieve as a whole, as measured by an XRF method.

2. The NaY molecular sieve according to claim 1, having a molar ratio of $SiO_2/Al_2O_3$ on the surface of 1 to 10 and a molar ratio of $SiO_2/Al_2O_3$ in a bulk phase of 2 to 20, wherein the bulk phase refers to a portion of the NaY molecular sieve in a region from a center to a location 6 mm beneath the surface of the NaY molecular sieve.

3. The NaY molecular sieve according to claim 1, having an Al content, calculated as $Al_2O_3$, of 18-26 wt %.

4. The NaY molecular sieve according to claim 1, having an average particle size of 200-600 nm.

5. A process of preparing the NaY molecular sieve according to claim 1, comprising the steps of:
preparing a directing agent having a molar composition $Na_2O:Al_2O_3:SiO_2:H_2O=(3-50):1: (3-50):(100-600)$;
a. mixing Gall the directing agent with a first silicon source to obtain a first mixture;
b. mixing the first mixture with a second silicon source, an aluminum source, and water to obtain a second mixture; and
c. carrying out hydrothermal crystallization on the second mixture and collecting a solid product,
wherein, calculated as $SiO_2$, a weight ratio of the first silicon source to the second silicon source is 1:(0.001-20).

6. The process according to claim 5, wherein the directing agent is prepared by a method comprising:
mixing an aluminum source with water glass to obtain a preliminary mixture;
carrying out dynamic aging and standing aging on the preliminary mixture; and
mixing the preliminary mixture with water to obtain the directing agent.

7. The process according to claim 5, wherein, in step a, the first silicon source is at least one selected from the group consisting of water glass, colloidal silica, and silica sol.

8. The process according to claim 5, wherein in step a, the first silicon source is a solid silicon source, and is mixed with the directing agent under stirring for 30-180 min.

9. The process according to claim 5, wherein in step b, the second mixture has a molar composition of $Na_2O:Al_2O_3:SiO_2:H_2O=(2-6):1:(8-20):(200-400)$.

10. The process according to claim 5, wherein in step b, the second silicon source is at least one selected from the group consisting of water glass, silica-alumina gel, and silica-alumina sol.

11. The process according to claim 5, wherein in step b, the aluminum source is at least one selected from the group consisting of sodium metaaluminate, aluminum sulfate, aluminum chloride, aluminum nitrate, and pseudoboehmite.

12. The process according to claim 5, wherein element aluminum in the directing agent accounts for 3 to 30% of the element aluminum in the second mixture, calculated as element in mol.

13. The process according to claim 5, wherein in step c, the hydrothermal crystallization is carried out at a temperature of 40-100° C. for a duration of 10-60 hours.

14. A process of preparing a modified Y molecular sieve, comprising steps of:
preparing the NaY molecular sieve according to the process of claim 5;
d. reacting the NaY molecular sieve with ammonium to reduce a sodium content, carrying out hydrothermal treatment, and dealuminization and silica supplementation to obtain the modified Y molecular sieve.

15. The process according to claim 14, wherein reducing the sodium content in step d comprises:
treating the NaY molecular sieve with an ammonium salt solution having an ammonium ion concentration of 0.1-1.0 mol/L at a temperature from normal temperature to 100° C. and a liquid-solid weight ratio of (8 to 15):1 for a duration of 0.2 to 3 hours.

16. The process according to claim 15, wherein the ammonium salt is at least one selected from the group consisting of ammonium nitrate, ammonium sulfate, ammonium chloride, and ammonium acetate.

17. The process according to claim 14, wherein the hydrothermal treatment comprises: treating the NaY molecular sieve having a reduced sodium content for 1-3 hours in 100% of steam at a gauge pressure of 0.1-0.3 MPa and a temperature of 400-700° C.

18. The process according to claim 14, wherein, in step d, the dealuminization and silica supplementation comprise: pulping the NaY molecular sieve obtained from the hydrothermal treatment to obtain a slurry with a liquid-solid weight ratio of (3-10):1, adding $(NH_4)_2SiF_6$ to the slurry at a dosage of 10-60 g $(NH_4)_2SiF_6$ per 100 g of the NaY molecular sieve, stirring the slurry at 80-120° C. for 0.5-5 hours, and recovering the product.

19. A modified Y molecular sieve obtained by the process according to claim 14.

20. The modified Y molecular sieve according to claim 19, having a molar ratio of $SiO_2/Al_2O_3$ in the bulk phase of 6 to 20.

21. The modified Y molecular sieve according to claim 19, wherein, measured by a BET method, the modified Y molecular sieve has a total pore volume of not less than 0.38 $cm^3/g$, and a secondary pore volume of not less than 0.06 $cm^3/g$, and cell parameters are $a=b=c=2.44-2.46$ nm.

22. The modified Y molecular sieve according to claim 19, wherein the modified Y molecular sieve has a sodium oxide content of not more than 0.1 wt % based on a total weight of the modified Y molecular sieve.

23. The NaY molecular sieve according to claim 1, wherein $1.1 \leq D \leq 6$.

24. The NaY molecular sieve according to claim 2, wherein the molar ratio of $SiO_2/Al_2O_3$ on the surface is 1 to 10, and the molar ratio of $SiO_2/Al_2O_3$ in the bulk phase is 4 to 15.

25. The NaY molecular sieve according to claim 3, wherein the Al content, calculated as $Al_2O_3$, is 21-25 wt %.

26. The process of preparing the NaY molecular sieve according to claim 5, wherein the molar composition of the directing agent is $Na_2O:Al_2O_3:SiO_2:H_2O=(6-25):1:(6-25):(200-400)$, and
wherein, calculated as $SiO_2$, the weight ratio of the first silicon source to the second silicon source is 1:(0.01-12).

27. The process according to claim 6, wherein the dynamic aging comprises aging under stirring at a temperature of 15-60° C. for 1-100 hours, and the standing aging comprises aging by standing at a temperature of 15-60° C. for 0.5-100 hours.

28. The process according to claim 10, wherein, in step b, the molar ratio of $SiO_2/Al_2O_3$ of the silica-alumina gel is 6-16 and the molar ratio of $SiO_2/Al_2O_3$ of the silica-alumina sol is 6-16.

29. The modified Y molecular sieve according to claim 20, wherein the molar ratio of $SiO_2/Al_2O_3$ in the bulk phase is 10.0 to 13.0.

30. The modified Y molecular sieve according to claim 21, wherein the modified Y molecular sieve has a total pore volume of not less than 0.40 $cm^3/g$ and a secondary pore volume of not less than 0.09 $cm^3/g$.

* * * * *